US010423646B2

(12) United States Patent
Lee et al.

(10) Patent No.: US 10,423,646 B2
(45) Date of Patent: Sep. 24, 2019

(54) METHOD AND APPARATUS FOR DATA-DRIVEN FACE-TO-FACE INTERACTION DETECTION

(71) Applicant: Alcatel-Lucent USA Inc., Murray Hill, NJ (US)

(72) Inventors: Jeongran Lee, Basking Ridge, NJ (US); Ahmet A. Akyamac, Bridgewater, NJ (US); Chitra Phadke, Basking Ridge, NJ (US); Huseyin Uzunalioglu, Millington, NJ (US)

(73) Assignee: NOKIA OF AMERICA CORPORATION, Murray Hill, NJ (US)

( * ) Notice: Subject to any disclaimer, the term of this patent is extended or adjusted under 35 U.S.C. 154(b) by 333 days.

(21) Appl. No.: 15/389,851

(22) Filed: Dec. 23, 2016

(65) Prior Publication Data

US 2018/0181639 A1 Jun. 28, 2018

(51) Int. Cl.
*G06F 16/28* (2019.01)

(52) U.S. Cl.
CPC .................... *G06F 16/285* (2019.01)

(58) Field of Classification Search
CPC ..................................... G06F 16/285
See application file for complete search history.

(56) References Cited

U.S. PATENT DOCUMENTS

| 7,509,131 | B2 | 3/2009 | Krumm et al. |
| 7,688,349 | B2 | 3/2010 | Flickner et al. |
| 8,712,686 | B2 | 4/2014 | Bandyopadhyay et al. |
| 8,847,754 | B2 | 9/2014 | Buchheim et al. |
| 2008/0263080 | A1 | 10/2008 | Fukuma et al. |
| 2011/0099054 | A1 | 4/2011 | Moriwaki et al. |
| 2014/0081596 | A1 | 3/2014 | Agrawal et al. |

OTHER PUBLICATIONS

Yu, Context-Aware Group Services for Proximity-Based Mobile Social Networking, 107 pages. (Year: 2015).*
Olguin, Social Sensors for Automatic Data Collection, pp. 1-10. (Year: 2008).*
Wen Dong et al., "Mapping Organizational Dynamics with Body Sensor Networks", Ninth International Conference on Wearable and Implantable Body Sensor Networks, 2012, 6 pages.
Geert Vanderhulst et al.,"Detecting Human Encounters from WiFi Radio Signals," 14th International Conference on Mobile and Ubiquitous Multimedia (MUM 2015), Nov. 2015, 12 pages.

(Continued)

*Primary Examiner* — Albert M Phillips, III
(74) *Attorney, Agent, or Firm* — Chiesa Shahinian & Giantomasi PC

(57) ABSTRACT

A method, apparatus and system for improved community discovery that enables the accurate real-time determination of linkages between groups of individuals in a data-driven manner that is insensitive to noise and/or missing/dropped signals for automatically capturing the dynamic real-time interaction between individuals. No pre-defined parameters are necessary and the operations provide a fully data-driven solution that can be applied and adapted to diverse and highly dynamic environments in real-time in an automated fashion.

18 Claims, 9 Drawing Sheets

(56) References Cited

OTHER PUBLICATIONS

Michael Morse et al., "An Efficient and Accurate Method for Evaluating Time Series Similarity," SIGMOD, Jun. 11-14, 2007, 12 pages.
Daniel Olgüin Olgúin et al., "Sensible Organizations: Technology and Methodology for Automatically Measuring Organizational Behavior", IEEE Trans. on Systems, Man and Cybernetics, Part B: Cybernetics, vol. 39, No. 1, Feb. 2009, 13 pages.

* cited by examiner

| | K | 5 | 3 | 3 | 5 | 4 | 3 | 3 | 4 | 4 | 4 | 4 | 3 | 3 | 4 | 4 | 3 | 2 | 3 |
|---|---|---|---|---|---|---|---|---|---|---|---|---|---|---|---|---|---|---|---|
| | St | 15:18:00 | 15:18:30 | 15:19:00 | 15:19:30 | 15:20:00 | 15:20:30 | 15:21:00 | 15:21:30 | 15:22:00 | 15:22:30 | 15:23:00 | 15:23:30 | 15:24:00 | 15:24:30 | 15:25:00 | 15:25:30 | 15:26:00 | 15:26:30 |
| | Et | 15:19:00 | 15:19:30 | 15:20:00 | 15:20:30 | 15:21:00 | 15:21:30 | 15:22:00 | 15:22:30 | 15:23:00 | 15:23:30 | 15:24:00 | 15:24:30 | 15:25:00 | 15:25:30 | 15:26:00 | 15:26:30 | 15:27:00 | 15:27:30 |
| 310-1 | A1 | 1 | 1 | 1 | 1 | 1 | 1 | 1 | 1 | 1 | 1 | 1 | 1 | 1 | 1 | 1 | 1 | 1 | 1 |
| 310-2 | A2 | 2 | 1 | 1 | 1 | 1 | 1 | 1 | 1 | 1 | 1 | 1 | 1 | 1 | 1 | 1 | 1 | 1 | 1 |
| 310-3 | A3 | 5 | 3 | 3 | 4 | 3 | 3 | 3 | 3 | 3 | 3 | 3 | 3 | 3 | 4 | 4 | 3 | 2 | 2 |
| 310-4 | A4 | 1 | 1 | 1 | 1 | 1 | 1 | 1 | 1 | 1 | 1 | 1 | 1 | 1 | 1 | 1 | 1 | 1 | 1 |
| 310-5 | A5 | 2 | 2 | 1 | 1 | 1 | 1 | 1 | 1 | 1 | 2 | 2 | 2 | 2 | 2 | 2 | 2 | 1 | 1 |
| 310-6 | A6 | 3 | 1 | 1 | 2 | 1 | 2 | 1 | 1 | 1 | 1 | 1 | 1 | 1 | 1 | 1 | 1 | 1 | 1 |
| 310-7 | A7 | 4 | 1 | 1 | 3 | 2 | 1 | 2 | 2 | 2 | 1 | 2 | 2 | 2 | 2 | 2 | 2 | 1 | 1 |
| 310-8 | A8 | 3 | 1 | 1 | 4 | 3 | 1 | 1 | 1 | 1 | 1 | 1 | 1 | 1 | 1 | 1 | 1 | 1 | 1 |
| 310-9 | A9 | 1 | 1 | 1 | 1 | 1 | 1 | 1 | 1 | 1 | 1 | 1 | 1 | 1 | 1 | 1 | 1 | 1 | 1 |
| 320-1 | B1 | 5 | 3 | 3 | 5 | 4 | 3 | 3 | 3 | 4 | 4 | 4 | 3 | 3 | 4 | 4 | 3 | 2 | 3 |
| 320-2 | B2 | 5 | 3 | 1 | 2 | 4 | 1 | 3 | 3 | 3 | 3 | 3 | 3 | 3 | 3 | 3 | 3 | 2 | 2 |
| 320-4 | B4 | 2 | 2 | 2 | 3 | 2 | 1 | 3 | 3 | 3 | 3 | 3 | 3 | 3 | 3 | 3 | 3 | 2 | 2 |
| 320-5 | B5 | 2 | 2 | 2 | 3 | 2 | 2 | 1 | 1 | 1 | 1 | 1 | 1 | 1 | 2 | 2 | 1 | 1 | 1 |
| 320-6 | B6 | 2 | 3 | 1 | 5 | 4 | 3 | 3 | 4 | 4 | 4 | 4 | 2 | 2 | 2 | 2 | 2 | 1 | 3 |
| 320-8 | B8 | 3 | 2 | 2 | 3 | 3 | 2 | 1 | 2 | 2 | 2 | 2 | 2 | 2 | 2 | 2 | 2 | 1 | 1 |
| 320-9 | B9 | 4 | 2 | 2 | 1 | 1 | 1 | 1 | 1 | 1 | 1 | 1 | 1 | 1 | 2 | 2 | 1 | 1 | 1 |

METHOD AND APPARATUS FOR DATA-DRIVEN FACE-TO-FACE INTERACTION DETECTION

TECHNICAL FIELD

The present invention relates generally to automatic community discovery, and, more particularly, to the detection of face-to-face (f2f) physical interactions between individuals on an automatic and data-driven basis.

BACKGROUND OF THE INVENTION

Being able to automatically track the real-time interactions between individuals in a group setting, for example, is key to understanding many aspects of community dynamics. For example, in an enterprise, organization performance is related to the structure of information flow between individuals, and such structure can be inferred from who interacts with whom and where such interactions occur at any given time. Therefore, from the information on how and where individuals in various branches of an organization behave and interact, the performance of such individuals (e.g., employees of enterprise) and the overall workplace environment can be improved through the reengineering of organizational dynamics.

Today, the proliferation of wearable devices equipped with high-performance mobile sensors has enabled the tracking of individuals and their various movements throughout the day, and a number of data sets have emerged to track the behavior and interactions of individuals within different types of organizations, with varying spatio-temporal resolutions and with different durations.

For example, certain existing solutions use pre-defined parameters to define human encounters such as the threshold of the duration of conversation, or timestamp differences of infra-red (IR) scanning, or the strength of received signal strength indicators (RSSI). However, given the proximity between individuals is calculated based on such ad-hoc parameters these techniques have certain limitations with respect to their adaptability in reflecting the dynamic environments of human interaction. Further, given this adaptability limitation, location tracking is critical for these approaches thereby increasing the automation challenge. In particular, location estimation based on indoor sensor network data is highly inaccurate due to the data's noisy nature inherent to low-power sensor signals, interference between objects in the same space, mobility factors, and other similar factors. As will be understood, known time-series clustering techniques could be used with respect to the sensor data in order to identify similarity between these time series, which would be a measure for physical proximity and interaction. However, unlike common time series clustering methods, the sensor signals need to be handled differently because of the high-level of noise and dynamics in group interactions.

Therefore, a need exists for an improved community discovery technique that enables the accurate real-time determination of linkages between groups of individuals in a data-driven manner that is insensitive to noise and/or missing/dropped signals for automatically capturing the dynamic real-time interaction between individuals.

BRIEF SUMMARY OF THE EMBODIMENTS

In accordance with various embodiments, a method, apparatus and system are provided for an improved community discovery technique that enables the accurate real-time determination of linkages between groups of individuals in a data-driven manner that is insensitive to noise and/or missing/dropped signals for automatically capturing the dynamic real-time interaction between individuals.

In accordance with an embodiment, a system is provided that is configured with one or more user devices having certain signal scanning capabilities, such devices include but are not limited to mobile phones, handhelds, smartphones, tablets, or stationary devices (e.g., a Raspberry Pi). The user device is configured for monitoring and collecting RSSI sensor data from one or more tags (e.g., iBeacon devices) that are associated with respective individuals in an indoor environment (e.g., tags carried or affixed as badges or IDs) and periodically sending the collected data to a central device (e.g., a server), from which the community detection results are determined and provided as output (e.g., one or more community graphs) in real-time, and made available for display to illustrate the dynamic interactions among the individuals in the indoor environment.

In accordance with the embodiment, in any type of indoor event, each event participant is provided a tag (e.g., iBeacon device) as described above. Each tag identifies a unique user, and the tag transmits a radio signal, whose strength (i.e., RSSI) is received by one or more mobile applications or scanners resident in or in proximity to the indoor event. As described above, these scanning features may be resident on various types of user devices which include stationary and/or mobile devices. The collected data is periodically transmitted, illustratively, to a server which automatically processes the data to generate f2f interaction groups and provides the results for inspection and analysis (e.g., using a visualization system comprising one or more display screens).

In this way, in accordance with an embodiment, a number of RSSI's collected from several scanners for each tag are processed to generate real-time community graphs to facilitate the comparing of patterns between RSSI time series collected from all references (i.e., scanners) located in different directions to infer their similarity in location and mobility for clustering purposes. In accordance with the embodiment, this is realized by performing operations such as: (i) real-time input updates: for a given tag, and for a defined time window, RSSI information is collected and accumulated; (ii) incompleteness imputation: for missing values/observations in a particular analytical window, zero values are dropped and replaced with (i.e., imputed) moving averages of the latest several observations or medians of observations in the window; (iii) smoothing: to capture the static or stationary status of a particular tag, the indirect location of the tag is determined using a smoothing operation (illustratively, using the well-known unbalanced Haar transform (UHT); (iv) change point detection: the mobility of a tag is detected using change point detection (illustratively, using well-known wild binary segmentation (WBS)) and a determination and recordation is made as whether the tag is moving towards or away from a particular scanner/user device; (v) feature engineering/feature vector definition: for each tag, a statistical summary is compiled of all smoothed signals from all scanners in each analytical window, which is combined with the change point detection results to define a plurality of feature vectors; (vi) clustering: features vectors for each tag are clustered into a plurality of clusters (illustratively, using well-known partitioning around medoids (PAM); and (vii) visualization: from the plurality of clusters of feature vectors the similarity between various tags are identified and visualized (illustratively, using the strength of links in graphs). In a further embodiment involving scenarios with ground truth, a validation is undertaken utilizing the ratios of correct pairwise links between tags over time in order to improve overall accuracy.

These and other advantages of the embodiments will be apparent to those of ordinary skill in the art by reference to the following detailed description and the accompanying drawings.

BRIEF DESCRIPTION OF THE DRAWINGS

FIG. 7 shows exemplary validation results in accordance with an embodiment;

DETAILED DESCRIPTION

In accordance with various embodiments, a method, apparatus and system are provided for an improved community discovery technique that enables the accurate real-time determination of linkages between groups of individuals in a data-driven manner that is insensitive to noise and/or missing/dropped signals for automatically capturing the dynamic real-time interaction between individuals.

Figure 1:
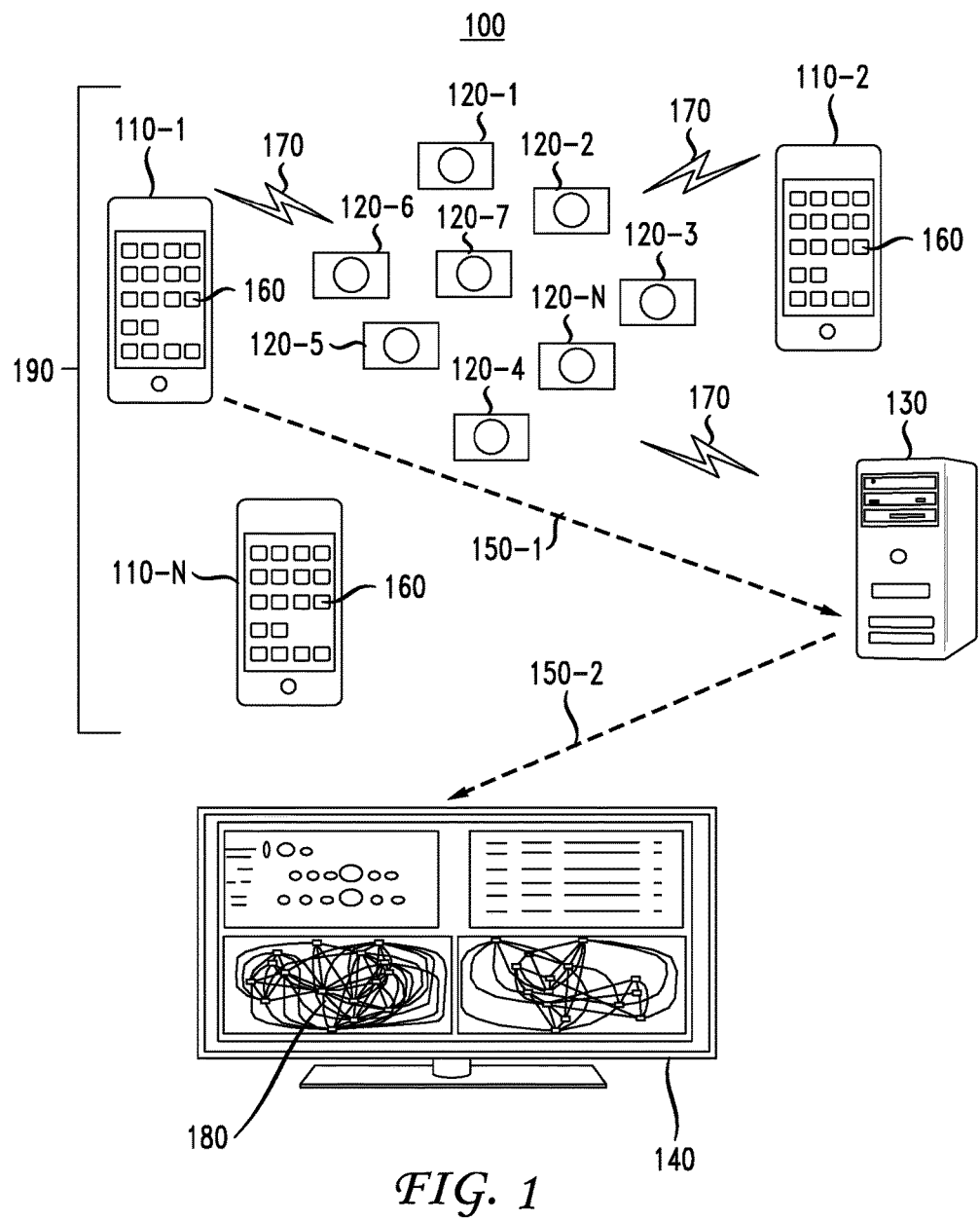
FIG. 1 shows an illustrative system in accordance with an embodiment.

FIG. 1 shows an illustrative system 100 in accordance with an embodiment that consists of one or more user devices (i.e., user devices 110-1, 110-2 through 110-N) having certain scanning capacity that will be further discussed below. User devices 110-1 through 110-N may be any number of devices that include but are not limited to mobile phones, handhelds, smartphones, tablets, or stationary devices (e.g., the well-known Raspberry Pi computing device). In accordance with the embodiment, user devices 110-1 through 110-N are configured for collecting RSSI sensor data via signals 170 transmitted from one or more tags (i.e., tag 120-1, 120-2, 120-3, 120-4, 120-5, 120-6, 120-7 through 120-N). These tags emit low power signals (e.g., Bluetooth® signals) in a well-known fashion and can be any number of well-known hardware/tag/beacon devices such as iBeacon, Wi-Fi, and ZigBee devices, to name just a few, that emit data frames for proximity data collection purposes. Illustratively, in accordance with an embodiment, each tag is set to a power level of −20 decibel-milliwatts (dBm), and set to broadcast at a rate of 4 Hz with 3 of every 4 frames being iBeacon frames. Each tag 120-1, 120-2, 120-3, 120-4, 120-5, 120-6, 120-7 through 120-N is associated with a respective individual (not shown) in indoor environment 190 (e.g., tags carried or affixed as badges or IDs that are specific to the individual). Indoor environment 190 may be any type of environment such as meetings, conferences, lectures, concerts, to name just few. As such, each tag 120-1 through 120-N identifies a unique user, and user devices 110-1 through 110-N periodically send collected data (e.g., RSSI) to a central device (e.g., a server), from which one or more community graphs are generated in real-time and made available for display to illustrate the dynamic interactions among the individuals in the indoor environment.

Illustratively, for any type of event or activity being held within indoor environment 190, each event participant that has been provided one of the tags (i.e., tag 120-1 through 120-N) will be associated with radio signals 170 transmitted by the respective tags, which signals have a particular signal strength (i.e., RSSI) which is seen (i.e., measured) by one or more of the user devices 110-1 through 110-N. The monitoring of such signals (and their associated data such as RSSI) is facilitated, illustratively, by the execution of one or more mobile applications resident thereon (i.e., mobile application 160). In this way, mobile devices 110-1 through 110-N, when executing mobile application 160, operate as scanners within indoor environment 190 and are constantly receiving (i.e., monitoring) signal 170 (and the associated RSSI signal strengths of tags 120-1 through 120-N, and individual RSSIs are determined by mobile devices 110-1 through 110-N based on the power of that received signal. As such, the mobile devices described herein may be alternatively referred to herein after as "scanners" or "scanning devices" depending upon the context. To be clear, mobile devices 110-1 through 110-N may located within or in proximity to indoor environment 190 (and the associated indoor event occurring therein). Also, while mobile devices 110-1 through 110-N are depicted in FIG. 1, as noted above, the aforementioned scanning features may be resident on various types of stationary and/or other types of mobile devices with equal application of the principles of the disclosed embodiments.

In accordance with the embodiment, the collected and generated data (including but not limited to RSSI signal strengths, as further detailed herein below) from user mobile devices 110-1 through 110-N is periodically transmitted via communications link 150-1, illustratively, to server 130. Server 130 automatically processes the data to generate f2f interaction groups (as will be further detailed herein below) and provides results 180, illustratively, via communication link 150-2 for display and analysis (e.g., using visualization system 140 comprising one or more display screens, for example). Communication links 150-1 and 150-2 can be any type of communication link for exchanging signals and/or data between devices such as Ethernet, Wi-Fi, and Bluetooth®, to name just a few.

In this way, in accordance with the embodiment herein, a number of RSSI's detected by and collected from several scanners for each badge are processed to generate real-time community graphs to facilitate the analysis and comparison of patterns between RSSI time series collected from all references (i.e., scanners) located in different directions to infer their similarity in location and mobility for clustering purposes.

Figures 2, 3:
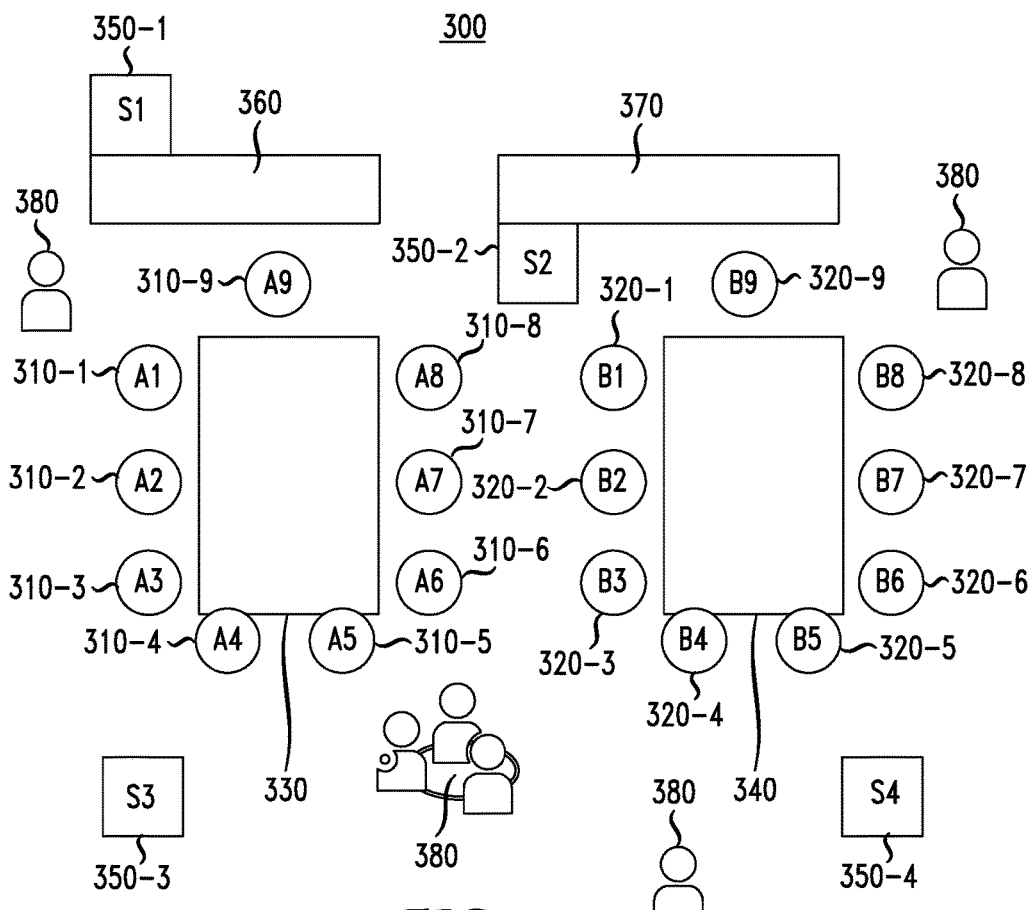
FIG. 2 shows an illustrative data format for collecting and exchanging data in accordance with an embodiment.
FIG. 3 shows an illustrative event scenario for face-to-face detection in accordance with an embodiment.

As discussed above, each tag 120-1 through 120-N is associated with certain data (e.g., RSSI signal strengths and other sensor data). To facilitate the exchange of such data, as collected by one or more of the mobile devices 110-1 through 110-N and transmitted there from to server 130, a preferred format may be utilized. In particular, FIG. 2 shows an illustrative data format 200 for the collection and transmission of information between the mobile devices and server in accordance with an embodiment. As shown in in FIG. 2, the illustrative data format is as follows (i) UUID 210 which is sixteen (16) bytes corresponding to thirty-two (32) hexadecimal digits utilized to indicate a unique location/place (e.g., "1" for cafeteria location, "2" for concert hall, "3" for a specific enterprise location, etc.) or specific tag models (e.g., "1" for a Supplier A, "2" for a Supplier B, "3" for Supplier 3, etc.), as transmitted from one of the tags 120-1 through 120-N; (ii) Major ID 220 is two (2) bytes that may either be a constant or variable amongst a specific tag type (e.g., "1" indicative of a specific geographic location), as transmitted from one of the tags 120-1 through 120-N. For example, associated with a food station in a cafeteria (e.g., American, Asian, Tex-Mex, etc.), or an area in a concert hall (e.g., orchestra, mezzanine, balcony, etc.); (iii) Minor ID 230 is two (2) bytes used to further distinguish unique tags (e.g., a particular building within an enterprise location), as transmitted from one of the tags 120-1 through 120-N; (iv) user ID 240 comprises a unique entry formed from a character string and an integer value (random number) to distinguish individual scanners (e.g., as resident on mobile devices 110-1 through 110-N), as created by one of mobile devices 110-1 through 110-N. User ID 240 is selectable by a particular user and the random number integer value is generated once per user; (v) scan tag 250 is a character string used to distinguish among different data trials being conducted within a particular indoor environment, as created by one of mobile devices 110-1 through 110-N; (vi) proximity label 260 is an optional field that is specific to mobile devices operating the well-known 105 operating system and may be utilized for proximity location associated with such devices, as created by one of mobile devices 110-1 through 110-N. Proximity label 260 is determined based on the RSSI signal strength; (vii) RSSI value 270 is a negative integer or zero value indicative of sensor signal strength (i.e., RSSI signal strengths as detailed above) transmitted by the tags and monitored by the nearby scanners, as created by one of mobile devices 110-1 through 110-N. As noted above, RSSI value 270 is used, among other things, to generate proximity label 260 that is a human-readable text of proximity (e.g., "very near", "near", "very far", "far", etc.) Zero values are considered as incomplete signal transmissions or transient signal drops caused by factors such as distance or connectivity, and large absolute value in the negative sign means the particular tag is further away from a particular scanner (e.g., a "−20 dbm" reading is associated with a tag that is closer in proximity to a scanner than a reading of "−40 dbm"); and (viii) timestamp 280 is the time (e.g., in UNIX time in milliseconds resolution), which can be adjusted to any time value desired, when the RSSI measurement was reported, as created by one of mobile devices 110-1 through 110-N.

As will be appreciated, data format 200 is illustrative in nature and embodiments may use any number and combination of the data fields detailed above. For example, an embodiment may utilize only UUID 210, Major ID 220, and Minor ID 230 where UUID 210 is a unique designation of tags (e.g., tags 120-1 through 120-N) running at a particular event, Major ID 220, illustratively a constant value, identifying a particular attendee group (e.g., corporate employee, external company, public press, university personnel, student, VIP, volunteer, etc.), and Minor ID 230 identifies a specific (i.e., unique) individual.

FIG. 3 shows an illustrative indoor event scenario 300 in order to further illustrate the disclosed embodiments for face-to-face detection, and facilitate an understanding thereof. For example, indoor event scenario 300 may be a meeting being conducted within a particular indoor environment (e.g., a conference room). Individuals 310-1, 310-2, 310-3, 310-4, 310-5, 310-6, 310-7, 310-8, and 310-9 are all assembled around conference table 330. Each of these individuals have a unique tag (not shown) such as tags 120-1 through 120-N configured as detailed above. Similarly, individuals 320-1, 320-2, 320-3, 320-4, 320-5, 320-6, 320-7, 320-8, and 320-9 are assembled around conference table 340. Each of these individuals has a tag (not shown) such as tags 120-1 through 120-N configured as detailed above. As shown, there are four different scanners (i.e., scanner 350-1, 350-2, 350-3 and 350-4) configured as detailed above and located throughout the indoor environment. That is, scanners 350-1 and 350-2 are stationary scanners situated on table 360 and table 370, respectively, and scanners 350-3 and 350-4 are mobile devices capable of roaming throughout the indoor environment. Interference group 380 is any number of individuals (either alone or in a group, and either stationary or in motion) within the indoor environment and proximate to the other individuals and scanners, however, these individuals in interference group 380 do not have tags as configured above, and are not involved with the community detection operations. Instead, the presence of (including the associated time duration) and mobility pattern of interference group 380 may cause a certain interference with the RSSI collection which will be needed to be accounted for in terms of overall data collection and analysis. For example, a group of people or a single person not carrying configured tag(s) passes by or remains situated for a period of time and such person(s) are located in-between other person(s) configured with tags, as detailed above, thereby creating the possibility of interference between the tags and scanners. As will be appreciated, humans (e.g., the individuals of interference group 380) are considered "high" to "very high" in terms of their signal interference potential. Of course, interference group 380 need not be restricted to human interference, as the following are also well-known interference possibilities that may also form part of interference group 380: (i) wood, synthetic materials, and glass (considered as "low" interference potential), (ii) bricks and marble (considered as "medium" interference potential), (iii) plaster, concrete, and bulletproof glass (considered as "high" interference potential; (iv) metal and water (considered as "very high" interference potential), and (v) extremely close or stacked tags, for example, multiple tags carried together in a single bag (considered as "high" interference potential).

As will be further detailed below, in accordance with an embodiment, a number of RSSI's measured and generated from the several scanners (i.e., scanners 350-1 through 350-4) for each tag (i.e., the tags specific to individuals 310-1 through 310-9, and individuals 320-1 through 320-9) are processed to generate real-time community graphs to facilitate the analysis and comparison of patterns between RSSI time series collected from all references (i.e., scanners) located in different directions to infer their similarity in location and mobility for clustering purposes thereby automatically capturing the dynamic interaction between such individuals.

Figure 4:
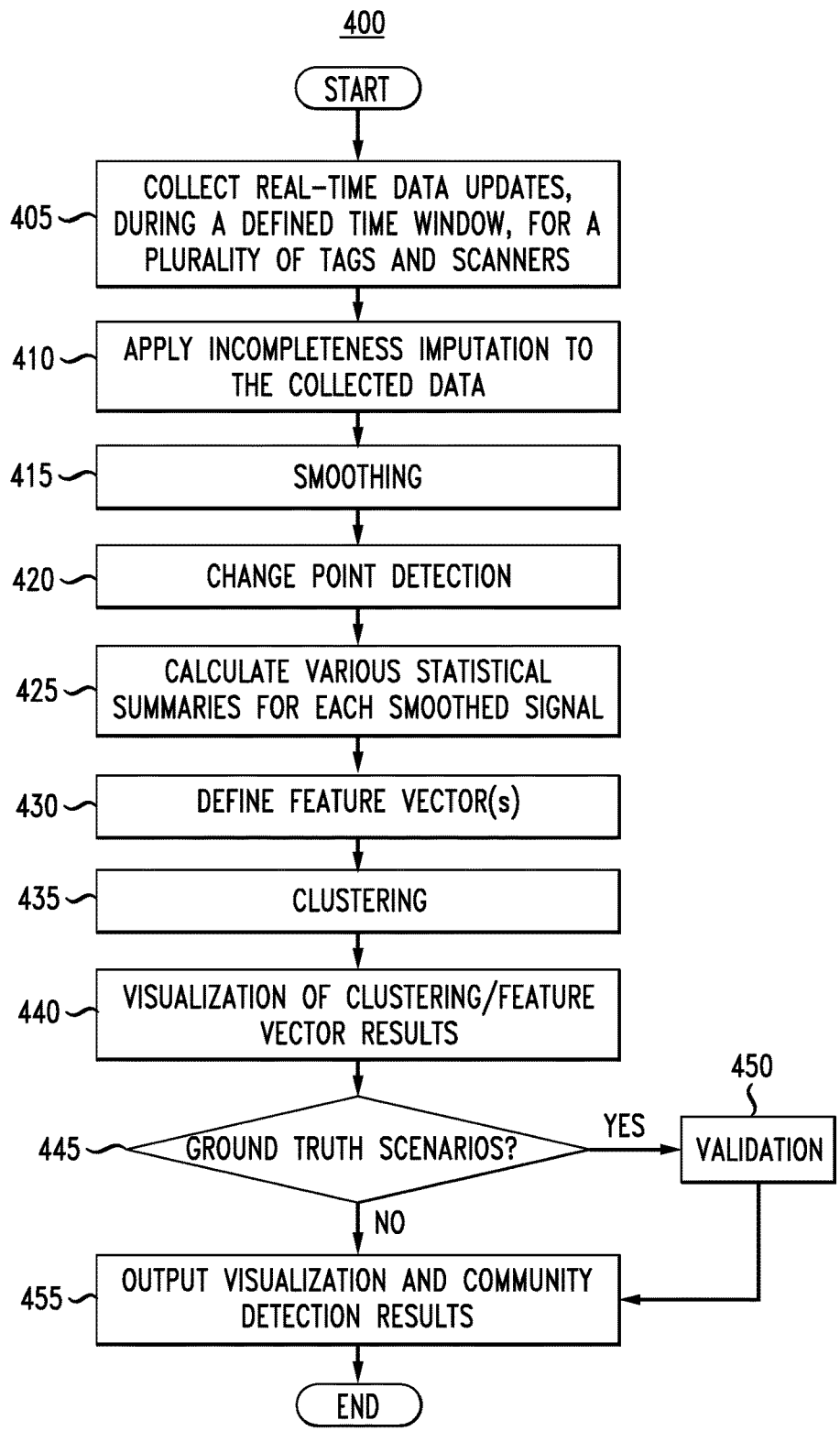
FIG. 4 shows a flowchart of illustrative operations for face-to-face detection in accordance with an embodiment.

FIG. 4 shows a flowchart of illustrative operations 400 for face-to-face detection in accordance with an embodiment. At step 405, real-time data updates are collected. In particular, in accordance with an embodiment, $r_i$, $i=1, \ldots, n$, is defined as the RSSI for the ith observation. At each time $t_i$, the server updates a noisy signal in accordance with: $r_i = f(t_i) + e_i$. The noisy signal is collected from a scanner (e.g., mobile device 110-1) and transmitted by a nearby tag (i.e., a person wearing the badge, for example, tag 120-1 associated with individual 320-1). The observed RSSI can be viewed as the true time series $f(t_i)$, the functional value of the sensor signal strength that is actually being transmitted in that distance between a particular tag and scanner at a given time, which has been perturbed by noise $e_i$, the fluctuation being caused by any number of possibilities (e.g., people and/or objects between or around tags and scanners). It will be noted that $e_i$ is an independent and identically distributed (i.i.d.) Gaussian random variable, $e_i \overset{i.i.d.}{\sim} N(0, \sigma^2)$. For a tag, $p=1, \ldots, n_p$, let the RSSI $r_i$ collected at a given time $t_i$ from a scanner $s=1, \ldots, n_s$ as $r_i(p,s)$, where $n_p$ and $n_s$ are the number of tags and scanners, respectively. The historical input data obtained and accumulated until a timestamp $t_T$ is denoted by $r_i$, where $i=1, \ldots, T$. Further, a hyper parameter is defined by $n_w$, $w=1, \ldots, n_w$, as a window size for the duration of the real-time analysis and is denoted as the so-called "analytics window". This fixed size window is moving over the timestamps in an overlapping manner as new input data is collected and updated into the cumulative data set, depending on the sensor collection granularity.

For example, if the iBeacon (e.g., tag 120-1) is set to transmit RSSI at an interval of every 5 seconds and data is collected during a 10 minute period, and the analysis window is set by 2 minutes, T=120 and $n_w=24$. Therefore, the current analytics window $w=1, \ldots, 24$ takes observations with timestamps $t_{97}, \ldots, t_{120}$ for the application of the operations herein. Since the moving window utilizes the most recent observations for analysis, with possible overlapping duration as the data set is updated, this real-time analysis can lead to capturing community dynamics in a more consistent and smooth (i.e., stable) as well as agile (i.e., adaptive) way. For f2f streaming analytics, in accordance with the embodiment, the analytical operations are not initiated until a sufficient number of $n_w$ observations are accumulated in the server (e.g., server 130).

Thus, in accordance with step 405, for a tag $p=1, \ldots, n_p$, there is a collection of RSSIs, $r_i(p,s)$, for tags $p=1, \ldots n_p$, scanners $s=1, \ldots, n_s$, during time window $t_i=T_1, \ldots, T_n$ for $i=1, \ldots, T$. Here, $n_p$ is the number of tags, $n_s$ is the number of scanners and $n$ is the data collection granularity in time. At step 410, incompleteness imputation is performed such that for missing values in n observations. More particularly, for every $n_w$ observations in an analytics window, zero values are dropped and replaced (i.e., imputed) with moving averages of the latest several observations or medians of observations in a particular analytics window to facilitate a more robust estimation. The former is a type of agile filter referring only to recent dynamics, whereas the latter provides more robust estimation caused by unstable connectivity. In accordance with the various embodiments herein, one may choose either one (or both) depending on the interest of the analysis undertaken.

At step 415, a smoothing operation is performed such that if a person with a tag is in a so-called static status (e.g., standing in one location), the signal should be constant and the strength of a signal can have a value corresponding to the distance from scanner, and based on estimated signal strength from several scanners, an inference is made regarding the location of a tag indirectly. More particularly, based on the estimated signal strength from several scanners, the location of a tag is inferred indirectly. To capture such static status and to infer the indirect location of a tag, $r_i$ is smoothed using, illustratively, the well-known Unbalanced Haar Transform (UHT). The estimated value of $f(t_i)$ smoothed from the noisy observation $r_i$ is denoted as $y_i$ in each analytics window, and provides information reflecting static status as well as estimated signal strength by piecewise constant values over time.

At step 420, change point detection is applied such that to capture the mobility of a tag, change points of $y_j$ are estimated using the well-known Wild Binary Segmentation (WBS) technique and the tag's direction to the scanner (i.e., moving towards the scanner or away therefrom) is also recorded as a binary label. In this way, the point-of-interest when and in what direction an individual moved (i.e., an individual with a tag) around a scanner can be inferred quickly and efficiently based on piecewise constant mean changes in the smoothed signal strength.

At step 425, certain statistical summaries are determined (so-called feature engineering), in particular, for a smoothed signal $y_i$ (see, step 415 above) summaries such as minimum, maximum, quartiles, mean, standard deviation, and mode are generated for each scanner. In this way, for each tag, a basic summary of smoothed signals $y_i(p,s)$ from all scanners in each analytics window is obtained. Such discrete information of dynamics in static signal strength is combined with the additional mobility information calculated (see, step 420 above) to define one or more feature vector $y_w(p)$ for a tag p and time window w at step 430. At step 435, clustering is performed such that these feature vectors associated with the tags are clustered into K groups using, illustratively, the well-known Partitioning Around Medoids (PAM) technique. In particular, an optimal value for K is selected as follows: (i) for each $K=2, \ldots, n_p-1$, the so-called Average Silhouette Width (ASW) is calculated in each group; and (ii) for groups with more than two members, the mean of ASW is calculated, and the value of K is selected with maximum of weighted average of non-singular member (i.e., the number of members in the group is at least 2) group's ASW:

$$K = \underset{k}{\arg\max} \frac{1}{k} \sum_{p=1,\ldots,n_p(k)>2|k\in\{2,\ldots,n_p-1\}} ASW_k(p)$$

where $ASW_k(p)$ the within-group average value is further detailed herein below. In this way, this operation is a type of penalty for the number of clusters to be derived from communities consisting of at least two members, for example, the number of clusters K=5 among tags $n_p=6$ can have 4 single individuals with 1 community with just two people, in which case a penalty is imposed of 1/k=1/5 in the sum of ASW.

An illustrative example of the aforementioned clustering operations will now be discussed. Suppose that one is interested in clustering $n_p$ elements $y(p)$, $p \in \{1, \ldots, n_p\}$ and that each vector element $y(p)$ is an n dimensional vector $(y_1(p), \ldots, y_n(p))^T$. Let $d(y(p), y(p'))$ denote the dissimilarity (or distance) between elements p and p' and let D be the $n_p \times n_p$ symmetric matrix of dissimilarities. Typical choices of dissimilarity include Euclidean distance, 1 minus (absolute) correlation, and 1 minus cosine-angle.

Using, illustratively, the well-known Partitioning Around Medoids (PAM) technique, facilitates the partitioning (i.e., clustering) of the data into a specified number of clusters around medoids by mapping a distance matrix with respect to any kinds of distance metric. PAM is a more robust version of K-means since the medoids are robust representations of the cluster centers, which is particularly important in the common context that many elements do not belong or correlate well to any specific cluster.

As will be understood, PAM takes as input a dissimilarity matrix D and produces as output a set of cluster centers or "medoids", which have the smallest average dissimilarity to all other objects in the set and are themselves elements in the set being clustered. These medoids identify the clusters and are selected as follows. Let K be the number of clusters and let M=(M$_1$, . . . , M$_K$) denote any size K collection of the n$_p$ elements y(p). Given M, one can calculate the dissimilarity d(y(p), M$_k$) of each element and each member of M. For each element y(p), the minimum and minimizer are denoted by:

$$\min d(y(p), M_k) = d_i(y(p), M),$$
$$k = 1, \ldots, K;$$
and
$$\min^{-1} d(y(p), M_k) = l_i(y(p), M)$$
$$k = 1, \ldots, K.$$

As such, PAM selects the medoids M* by minimizing the sum of such distances M*=min$_M$$^{-1}$ d$_1$(y(p),M). Each medoid M$_k$* identifies a cluster, defined as the elements which are closer to this medoid than to any other. This clustering is captured by a vector of labels: I(Y, M*)=(I$_1$(y(1), M*), . . . , I$_1$ (y(p), M*)). The so-called "silhouette" for a given element is calculated as follows: for each element p, calculate the "silhouette width'" a$_p$ which is the average dissimilarity of element p with other elements of that cluster: a$_p$=avg d(y(p), y(p')), p'ϵ{p: I$_1$(y(p), M)=I$_1$(y(p'), M)}. For each element p and each cluster k to which it does not belong (i.e., k≠I$_1$(y(p), M)), calculate b$_{pk}$, which is the average dissimilarity of element p with the members of cluster K as: b$_{pk}$=avg d(y(p), y(p')), p'ϵ{p: I$_1$(y(p), M)=k}. Then, let b$_p$=min$_k$ b$_{pk}$ and the ASW of element p is defined as: Sp(M)=b$_p$−a$_p$/max(a$_p$,b$_p$). (Here S$_p$(M) is used to calculate within-group average value ASW$_k$(p)=avg$_{p\epsilon}$M$_k$(S$_p$(M$_k$)) as detailed herein above.) Note that the largest possible silhouette is "1", which occurs only if there is no dissimilarity within element p's cluster (i.e., a$_p$=0). The other extreme is a silhouette of "−1". Observation with the large silhouette width (i.e., approximately 1) are very well clustered, a small value (i.e., approximately 0) means that the observation lies between two clusters, and observations with a negative value are probably placed in the wrong cluster. Also, a community detection is possible as follows: feature vectors y$_w$(p) for tags p=1, . . . , n$_p$ at an analytics window w are clustered into K groups by PAM. An optimal K value is selected as detailed above.

Figure 5A:
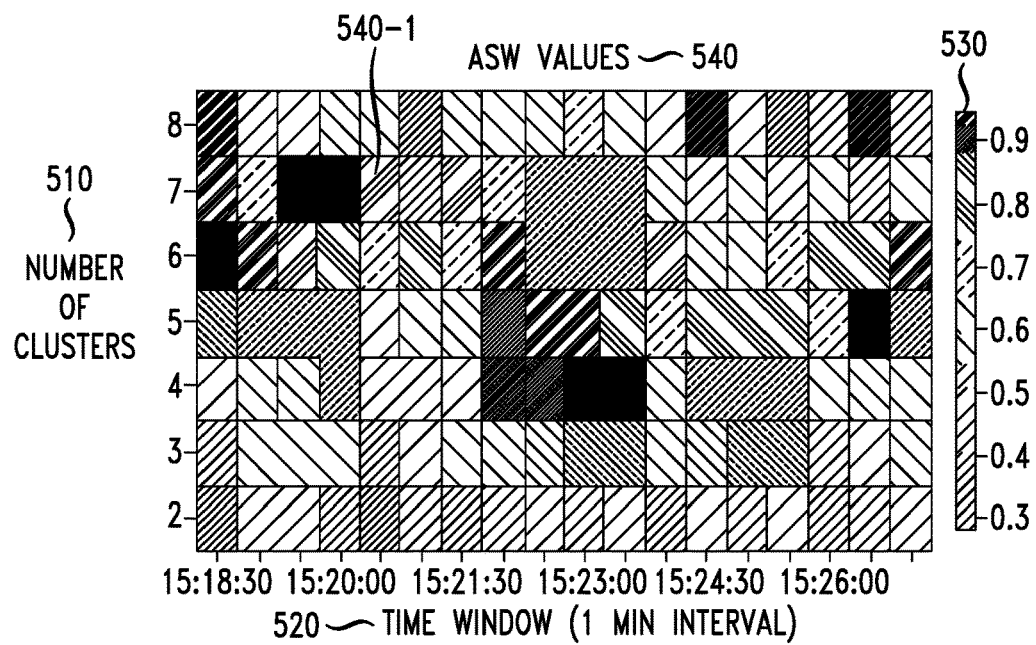
FIGS. 5A, 5B, 5C, and 5D depict exemplary analytical and clustering results in accordance with an embodiment.
Figure 5B:
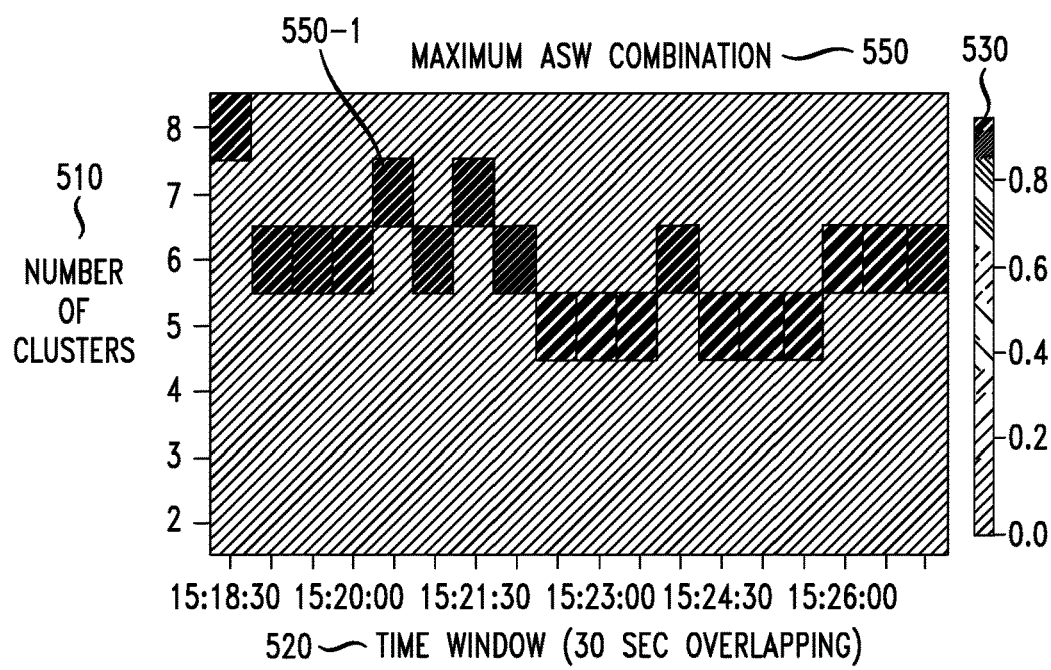
Figure 5C:
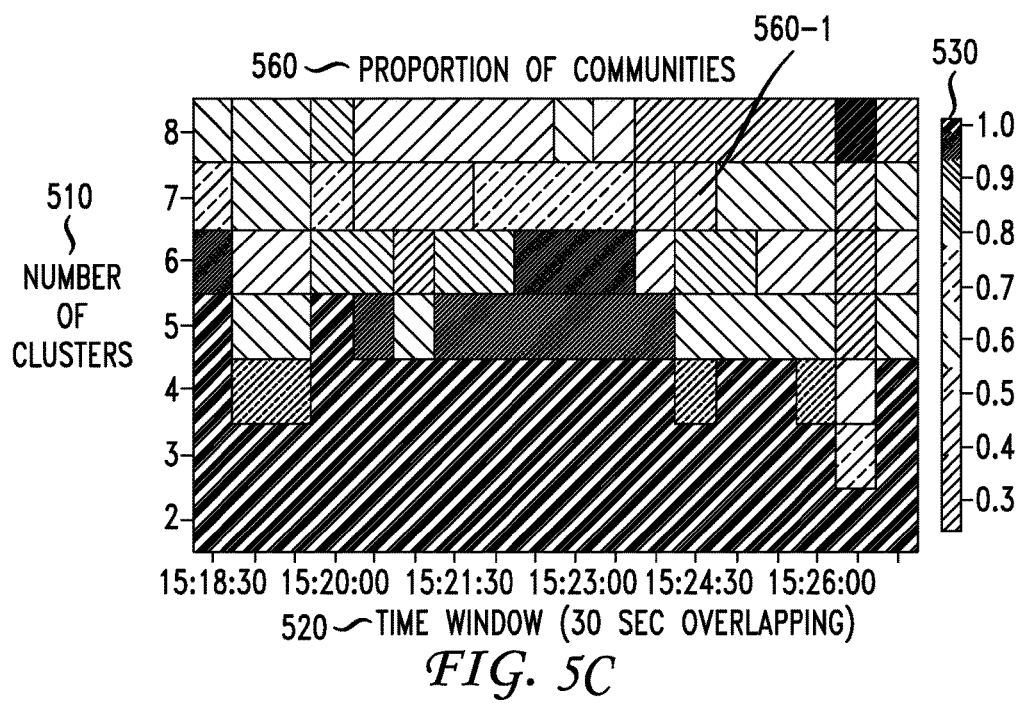
Figure 5D:
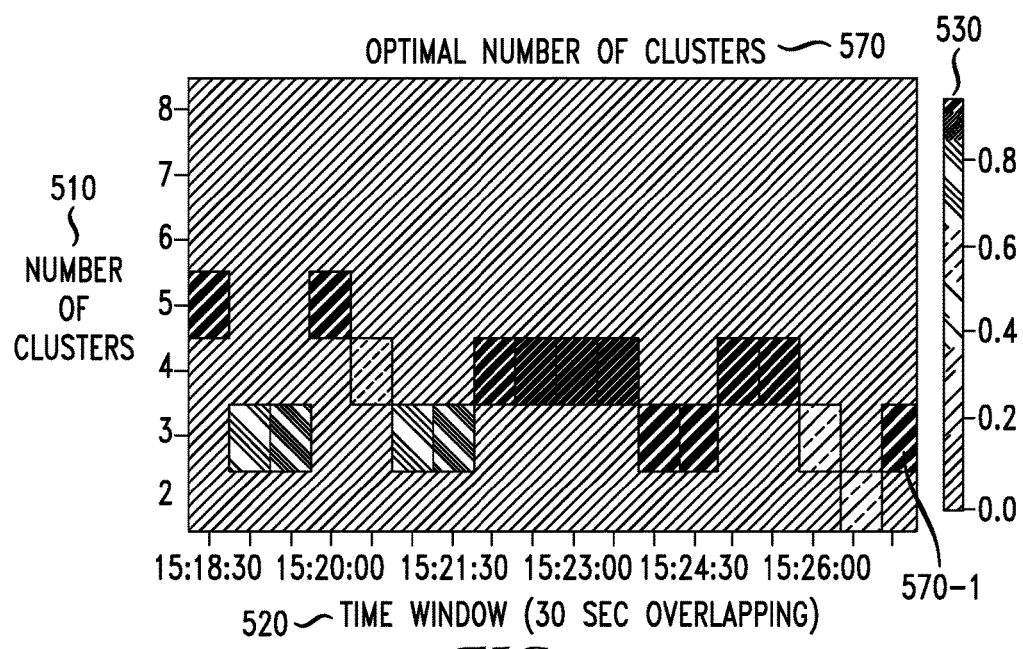

Turning our attention briefly to FIGS. 5A, 5B, 5C and 5D, these figures depict exemplary analytical and clustering results in accordance with an embodiment. Each figure depicts certain results in terms of number of clusters 510, time window 520, and index 530. In particular, FIG. 5A shows ASW values 540 over a range of number of clusters during a one minute timer interval. For example, ASW value 540-1 is 0.8682. FIG. 5B shows maximum ASW combination 550 over a range of number of clusters and a thirty second overlapping time window. For example, maximum ASW combination 550-1 is 0.8682. FIG. 5C shows proportion of communities 560 over range of number of clusters and a thirty second overlapping time window. For example, proportion of communities 560-1 is 0.4286. FIG. 5D shows optimal number of clusters 570 over a range of number of clusters and a thirty second overlapping time window. For example, optimal number of clusters 570-1 is 3.

Next, at step 440, from K clusters of feature vectors, the similarity between tags is visualized via the strength of links in graphs. Under scenarios with ground truth, the ratios of correct pairwise links between tags are calculated over time to provide accuracy of these operations. At steps 445 and 450, under scenarios with ground truth, the ratios of correct pairwise links between tags are calculated over time to further enhance the accuracy of the operations. At step, 455, the visualization and community detection results are outputted for observation and analysis.

Figure 6:
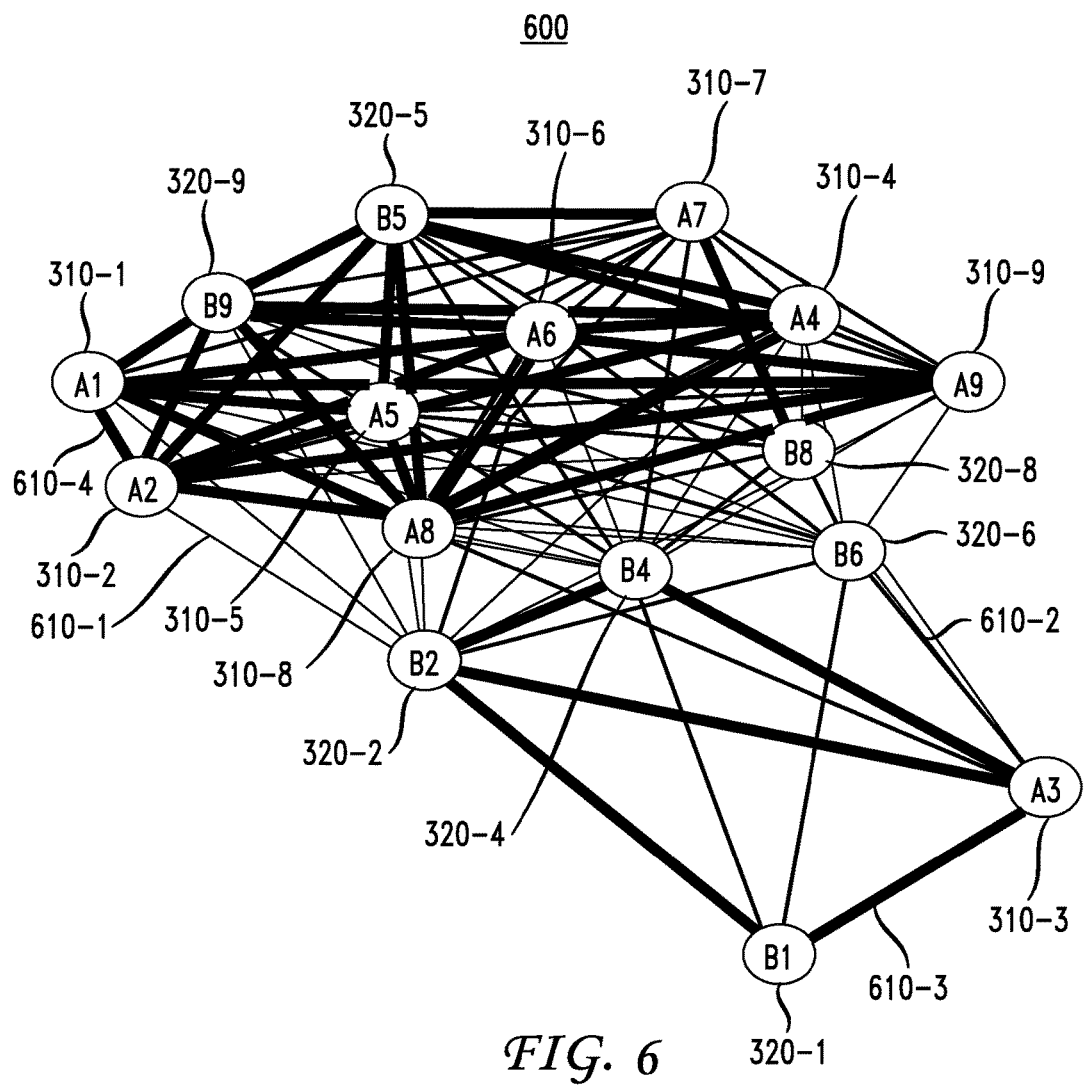
FIG. 6 shows an exemplary visualization result in accordance with an embodiment.

To further illustrate the above operations and their associated results, FIG. 6 depicts an exemplary visualization result 600 in accordance with an embodiment. In particular, visualization result 600 shows, from K clusters of feature vectors calculated as detailed above, the similarity between tags (e.g., the tags associated with individuals 310-1, 310-2, 310-3, 310-4, 310-5, 310-6, 310-7, 310-8, 310-9, 320-1, 320-2, 320-4, 320-5, 320-6, 320-8, and 320-9) via the strength of links (e.g., links 610-1, 610-2, 610-3 and 610-4). For example, in accordance with an embodiment, the interaction between different individuals (and their respective tags) is represented by the strength of their encounters as derived from the accumulated and updated clustering results in overlapping temporal windows, as detailed above. Therefore, in terms of exemplary visualization result 600, link 610-4 depicts a much stronger encounter between tags/individuals 310-1 and 310-2 than depicted by link 610-1 and the encounter between tags/individuals 310-2 and 320-2. Similarly, links 610-2 and 610-3 fall somewhere in between links 610-4 and 610-1 in terms of their respective strengths of links.

FIG. 7 depicts exemplary validation results 700 in accordance with an embodiment. As shown, validation results 700 involve the tags associated with individuals 310-1, 310-2, 310-3, 310-4, 310-5, 310-6, 310-7, 310-8, 310-9, 320-1, 320-2, 320-4, 320-5, 320-6, 320-8, and 320-9, and the results are depicted in terms of optimally selected number of clusters 710, time intervals 730, and the assigned group ID numbers for each tag 720 during the time window 15:22:30-15:23:30. For example, designation 720-1 means that tag 320-4 is clustered in group ID 3 with tag 320-2 during time window 15:22:30-15:23:30. Based on ground truth, the detection of these tags as in the same group is sound.

Advantageously, in accordance with the various embodiments, no pre-defined parameters are necessary and the operations provide a fully data-driven solution that can be applied and adapted to diverse and highly dynamic environments in real-time in an automated fashion.

Figure 8:
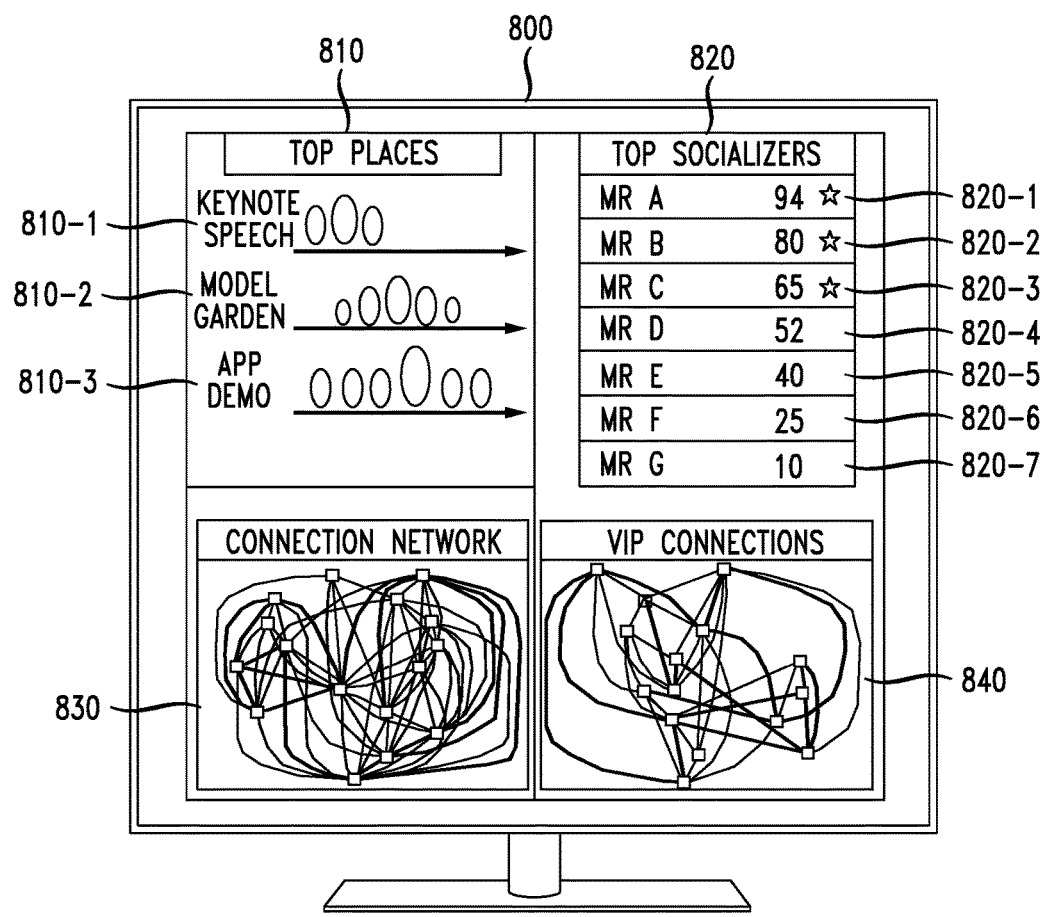
FIG. 8 shows an exemplary display system in accordance with an embodiment.

FIG. 8 shows exemplary display system 800 in accordance with an embodiment that further demonstrates the ability to automatically track interactions between individuals (i.e., who interacts with whom) in real-time and the ability to analyze and understand various aspects of community dynamics. Display system 800 shows various exemplary items that result from application of the above-detailed operations, in particular, the results shown include top places 810, top socializers 820, connection network 830, and VIP connections 840. Top places 810 shows three different places (i.e., place 810-1, place 810-2, and place 810-3) that are locations having a high concentration of individuals during an analysis period. Similarly, top socializers 820 show a priority listing of socializers (i.e., individuals 820-1, 820-2, 820-3, 820-4, 820-5, 820-6, and 820-7) from highest levels of socialization (i.e., individual 820-1) to lowest levels of socialization (i.e., individual 820-7) during the analysis period. Connection network 830 and VIP connections 840 depict strengths of links in graphs (as detailed above) that show a variety of interactions between different individuals.

Figure 9:
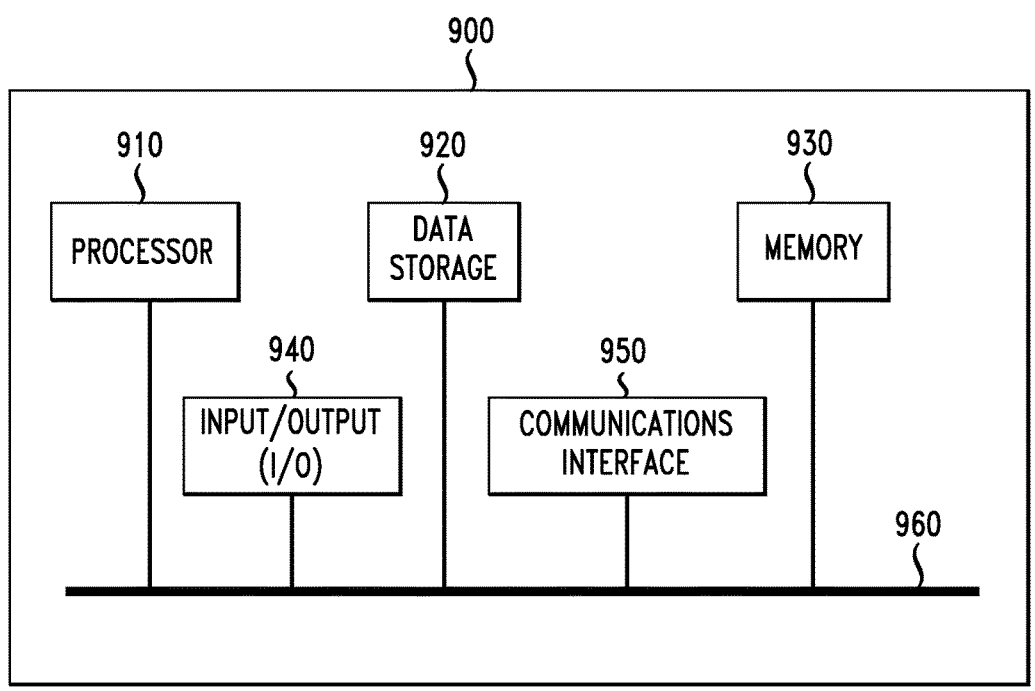
FIG. 9 is a high-level block diagram of an exemplary user device in accordance with an embodiment.

As detailed above, the various embodiments herein can be embodied in the form of methods and apparatuses for practicing those methods. The disclosed methods may be performed by a combination of hardware, software, firmware, middleware, and computer-readable medium (collectively "computer") installed in and/or communicatively connected to a user device. FIG. 9 is a high-level block diagram of an exemplary user device 900 that may be used for implementing a method for improved community discovery and detection that enables the accurate real-time determination of linkages between groups of individuals and automatically captures the dynamic interaction between such individuals in accordance with the various embodiments herein. User device 900 comprises a processor 910 operatively coupled to a data storage device 920 and a memory 930. Processor 910 controls the overall operation of user device 900 by executing computer program instructions that define such operations. Communications bus 960 facilitates the coupling and communication between the various components of user device 900. Of course, user device 900 may be any type of computing device such a computer, tablet, server, mobile device, smart phone, to name just a few. The computer program instructions may be stored in data storage device 920, or a non-transitory computer readable medium, and loaded into memory 930 when execution of the computer program instructions is desired.

Thus, the steps of the disclosed method (see, e.g., FIG. 4) and the associated discussion herein above) can be defined by the computer program instructions stored in memory 930 and/or data storage device 920 and controlled by processor 910 executing the computer program instructions. For example, the computer program instructions can be implemented as computer executable code programmed by one skilled in the art to perform the illustrative operations defined by the disclosed method. Accordingly, by executing the computer program instructions, processor 910 executes an algorithm defined by the disclosed method. User device 900 also includes one or more communication interfaces 950 for communicating with other devices via a network (e.g., a wireless communications network) or communications protocol (e.g., Bluetooth®). For example, such communication interfaces may be a receiver, transceiver or modem for exchanging wired or wireless communications in any number of well-known fashions. User device 900 also includes one or more input/output devices 940 that enable user interaction with the user device (e.g., camera, display, keyboard, mouse, speakers, microphone, buttons, etc.).

Processor 910 may include both general and special purpose microprocessors, and may be the sole processor or one of multiple processors of user device 900. Processor 910 may comprise one or more central processing units (CPUs), for example. Processor 910, data storage device 920, and/or memory 930 may include, be supplemented by, or incorporated in, one or more application-specific integrated circuits (ASICs) and/or one or more field programmable gate arrays (FPGAs).

Data storage device 920 and memory 930 each comprise a tangible non-transitory computer readable storage medium. Data storage device 920, and memory 930, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 940 may include peripherals, such as a camera, printer, scanner, display screen, etc. For example, input/output devices 940 may include a display device such as a cathode ray tube (CRT), plasma or liquid crystal display (LCD) monitor for displaying information to the user, a keyboard, and a pointing device such as a mouse or a trackball by which the user can provide input to user device 900.

It should be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor ("DSP") hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computer system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting group dynamics, the method comprising:
receiving a plurality of sensor data associated with a plurality of individuals of a group, wherein each individual of the plurality of individuals is associated with a specific tag of a plurality of tags;
defining a plurality of feature vectors using the plurality of sensor data;
clustering the plurality of feature vectors into a plurality of clustered feature vector groups;
selecting an optimal number of clustered feature vector groups using similarity of location and mobility between particular ones of the plurality of tags; and
generating, from the optimal number of clustered feature vector groups, one or more outputs that are representative of strength of encounters associated with one or more face-to-face interactions between particular ones of the plurality of individuals.

2. The method of claim 1, further comprising:
determining a receiver signal strength indicator (RSSI) associated with a respective one or more tags using a signal received from the respective one or more tags, the RSSI forming part of the plurality of sensor data.

3. The method of claim 2, wherein the respective signals are received by at least one scanner of a plurality of scanners.

4. The method of claim 2 wherein each specific tag of the plurality of tags is associated with a particular one of the plurality of feature vectors, the method further comprising:
measuring a proximity between particular ones of the specific tags using their associated feature vectors.

5. The method of claim 1 wherein the one or more outputs are visual outputs representative of the strength of encounters associated with the one or more face-to-face interactions between the particular ones of the plurality of individuals.

6. The method of claim 2 wherein the clustering the plurality of feature vectors further comprises:
comparing one or more patterns, during a specified time window, associated with the RSSI sensory data to determine the similarity of location and mobility between particular ones of the plurality of tags.

7. The method of claim 4 wherein the clustering the plurality of feature vectors uses a Partitioning Around Medoids (PAM).

8. An apparatus for detecting group dynamics, comprising:
a processor; and
a memory storing instructions that when executed cause the processor to perform operations comprising:
receiving a plurality of sensor data associated with a plurality of individuals of a group, wherein each individual of the plurality of individuals is associated with a specific taq of a plurality of tags;
defining a plurality of feature vectors using the plurality of sensor data;
clustering the plurality of feature vectors into a plurality of clustered feature vector groups;
selecting an optimal number of clustered feature vector groups using similarity of location and mobility between particular ones of the plurality of tags; and
generating, from the optimal number of clustered feature vector groups, one or more outputs that are representative of strength of encounters associated with one or more face-to-face interactions between particular ones of the plurality of individuals.

9. The apparatus of claim 8, the operations further comprising:
determining a receiver signal strength indicator (RSSI) associated with a respective one or more tags using a signal received from the respective one or more tags, the RSSI forming part of the plurality of sensor data.

10. The apparatus of claim 9 wherein the respective signals are received by at least one scanner of a plurality of scanners.

11. The apparatus of claim 9, wherein each specific tag of the plurality of tags is associated with a particular one of the plurality of feature vectors, and the operations further comprise:
measuring a proximity between particular ones of the specific tags using their associated feature vectors.

12. The apparatus of claim 8, wherein the one or more outputs are visual outputs representative of the strength of encounters associated with the one or more face-to-face interactions between the particular ones of the plurality of individuals.

13. The apparatus of claim 9, wherein the clustering the plurality of feature vectors further comprises:
comparing one or more patterns, during a specified time window, associated with the RSSI sensory data to determine the similarity of location and mobility between particular ones of the plurality of tags.

14. The apparatus of claim 11 wherein the clustering the plurality of feature vectors uses a Partitioning Around Medoids (PAM).

15. The apparatus of claim 12 further comprising:
a display for displaying the one or more outputs.

16. A non-transitory computer-readable medium storing computer program instructions for detecting group dynamics, the computer program instructions, when executed on a processor, cause the processor to perform operations comprising:
receiving a plurality of sensor data associated with a plurality of individuals of a group, wherein each individual of the plurality of individuals is associated with a specific tag of a plurality of tags;
defining a plurality of feature vectors using the plurality of sensor data;
clustering the plurality of feature vectors into a plurality of clustered feature vector groups;
selecting an optimal number of clustered feature vector groups using similarity of location and mobility between particular ones of the plurality of tags; and
generating, from the optimal number of clustered feature vector groups, one or more outputs that are representative of strength of encounters associated with one or more face-to-face interactions between particular ones of the plurality of individuals.

17. The non-transitory computer-readable medium of claim 16, the operations further comprising:
determining a receiver signal strength indicator (RSSI) associated with a respective one or more tags using a signal received from the respective one or more tags, the RSSI forming part of the plurality of sensor data.

18. The non-transitory computer-readable medium of claim 17, wherein the clustering the plurality of feature vectors further comprises:
comparing one or more patterns, during a specified time window, associated with the RSSI sensory data to determine the similarity of location and mobility between particular ones of the plurality of tags.

* * * * *